United States Patent [19]
Lacheze et al.

[11] Patent Number: 5,956,698
[45] Date of Patent: Sep. 21, 1999

[54] INFORMATION BROKER FOR PRINTING SYSTEM

[75] Inventors: Joel Lacheze, London, United Kingdom; Elizabeth D. Fox, Rochester, N.Y.

[73] Assignee: Xerox Corporation, Stamford, Conn.

[21] Appl. No.: 08/903,695

[22] Filed: Jul. 31, 1997

[51] Int. Cl.⁶ .................................................. G06F 17/60
[52] U.S. Cl. ................................................ 705/34; 705/16
[58] Field of Search ............................................ 705/34, 16

[56] References Cited

U.S. PATENT DOCUMENTS

| | | | |
|---|---|---|---|
| 3,932,730 | 1/1976 | Ambrosio | 235/432 |
| 4,110,606 | 8/1978 | Prince et al. | 235/432 |
| 5,077,582 | 12/1991 | Kravette et al. | 399/10 |
| 5,146,344 | 9/1992 | Bennett et al. | 358/296 |
| 5,184,179 | 2/1993 | Tarr et al. | 399/8 |
| 5,383,129 | 1/1995 | Farrell | 705/400 |
| 5,557,515 | 9/1996 | Abbruzzese | 705/9 |

*Primary Examiner*—Allen R. MacDonald
*Assistant Examiner*—Philip Marsh
*Attorney, Agent, or Firm*—Gary B. Cohen

[57] ABSTRACT

There is disclosed a method for use in a printing system for producing copies or prints in which billing is developed for a customer of the printing system for the produced copies or prints on a basis of a set of accounting information accumulated and stored in an accounting subsystem. The printing system includes an input/output station communicating with the accounting subsystem by way of a network, and the method facilitates the generation of a set of billing/pricing information for transmission to a selected location upon the occurrence of a selected event related to the printing system. The method includes the steps of: a) electronically receiving a subset of the accounting information at the accounting subsystem; b) electronically updating the set of accounting information in response to the electronic receiving of a); c) analyzing the updated set of accounting information to determine if the selected event related to the printing system has occurred; and d) when the selected event related to the printing system has occurred, transmitting automatically the set of billing/pricing information to the selected location.

15 Claims, 11 Drawing Sheets

DESCRIPTION

Billable Event Supplier:

Request: Configure / Record

Event: Attribute(s) [Value(s)]

Miscellaneous Information:

INFORMATION BROKER FOR PRINTING SYSTEM

BACKGROUND AND MATERIAL DISCLOSURE STATEMENT

This invention relates generally to a printing system with an accounting subsystem and more particularly to an improvement for the printing system in which a set of accounting information is updated in the accounting subsystem and the updated set is analyzed to determine if a selected event has occurred in the printing system. Provided that the selected event has occurred, a set of billing/pricing information is transmitted automatically to a location selected by a customer.

Electronic reprographic machines or electronic printing systems may possess a wide range of system functions, including binding, scanning, stapling, stitching, shrink wrapping, etc. A print shop may use an electronic reprographic machine with robust functionality to meet the needs of customers who seek copies of "short run" jobs. Even though short run jobs may not require the setting of a master, they still may utilize a large range of functions and materials (e.g. paper and toner). Maintaining records of those functions employed and materials used is a simple matter for electronic reprographic machines with digital capability and mass memory, e.g. a disk storage device.

In one example, a record of the materials used for each short run job (hereinafter referred to simply as "job") is maintained in a dedicated account for a customer. In one conventional approach, such as that disclosed in U.S. Pat. No. 5,117,258 to Iwata (Issued: May 26, 1992), each customer is mapped to a given paper type set with a plurality of paper types. Additionally, each paper type in the set is provided with a fixed rate. As the job for a given customer is executed, the number of sheets used for each paper type is counted and the number of sheets used for each paper type is tabulated. The tabulated sums are then multiplied with their respective rates so that a billable amount for the paper types used can be determined. The billable amounts are then summed to provide a total cost for paper used.

The approach of Iwata appears to be inefficient, with respect to memory usage because, as shown in FIG. 10 of Iwata, the set of paper types is set uniformly for each customer. It will be appreciated that the needs of the customers changes over time and the demand of even a single customer may vary over time. This apparent problem of setting uniform account size for each customer appears to be solved by U.S. Pat. No. 5,146,344 to Bennett (Issued: Sep. 8, 1992) in which a machine administrator can create a new account and specify a subset of system functions, from a set of system functions, to be used in the new account. In particular, it is believed that the set of system functions is "hard-coded" into the associated electronic reprographic machine in the form of a predesignated set of billing meters and the system administrator can specify which of the billing meters in the hardcoded set are to be used in setting up the new account.

While this approach disclosed by Bennett is certainly more flexible than the approach provided by Iwata, the Bennett approach is not believed to provide a maximum degree of flexibility in either accommodating for new billing meters or providing for the deletion of preexisting billing meters. Moreover, the account setup disclosed by Bennett is believed to be inflexible in that an account is set up in terms of customers rather than jobs. Now allowed U.S. patent application Ser. No. 08/655,421 entitled "Accounting System for Use with Document Processing System", filed on May 30, 1996 by Krist et al., discloses an improvement, with respect to Bennett, in which meters are maintained in a flexible, configurable arrangement such that information with respect to one or more executed jobs can be recorded readily.

In the Krist approach, usage information sets are communicated to an account log manager which, in turn, stores the information sets in an account log as a virtually integrated unit. In one example, the information for one or more given jobs comprises subsets of cumulative entries, which entries may be communicated to a central billing service in terms of a report. The report which may include usage information regarding, among other things, toner usage and paper usage, can then be processed with a customer billing template or algorithm to generate an invoice for the one or more jobs. Typically, the invoice will be generated for a given period of usage after that given period has elapsed.

The process of sending usage information to a central processing facility at the end of the given period for generation of an invoice is well suited for situations in which the user seeks little interaction with the billing process during the given period and the customer billing algorithm is rather straightforward. For instance, one user who produces a relatively small number of black and white copies at a metered copier may not have much interest in obtaining a bill estimate during the given period nor in learning about discount options which may vary as a function of material/machine usage. Another user who uses a given copier/printer extensively for a wide variety of applications, however, may have very different demands with respect to obtaining usage information during the given period. For instance, a frequent user of a printing system may desire, prior to the end of the given period, to obtain an estimate of his/her current bill as well as an indication as to how further usage might trigger certain usage discounts.

Estimates based on job related information can be obtained with the technique disclosed by U.S. Pat. No. 5,383,129 to Farrell (Issued Jan. 17, 1995). In particular, the printing system of Farrell is capable of gathering information from a job ticket and providing an invoice, representing an estimate of printing material cost, based on the gathered information. The Farrell system, while well suited for network applications, does not contemplate a system in which a user interacts with a printing system, via a network, to obtain an optimum billing rate. It would be desirable to provide a network oriented billing/accounting system which interacts with a user/customer to provide the same with bill estimation capability.

Interaction between a printing system and a user, across a network, to optimize system usage is believed to be known. For example, it is understood that an arrangement has been disclosed in which a printing machine controller is apprised of when the corresponding printing machine is low on a printing material, such as toner, and the controller transmits a signal, via a communications network, to a remote station for indicating that more toner is to be supplied. Essentially, the controller is providing the machine with a level of intelligence in that a function commonly facilitated by an administrator (or the like) is instead facilitated by the machine.

While the intelligent toner billing system represents an advancement in the use of a networked system to optimize printing machine functionality, it still lacks the level of interactivity felt necessary to accommodate for an optimum billing system in which a printing machine operates in cooperation with a user to provide the user with the best "deal" possible. It would desirable to provide a printing system in which billing information is provided to a user in such a manner that the user is permitted to make the best decisions with respect to machine usage.

The present invention is particularly suited for use in a network environment, such as in the context of the world wide web, the internet or the like. Examples of some recent patents relating to network environments of plural remote terminal shared users of networked printers include Xerox Corporation U.S. Pat. Nos. 5,483,653, 5,243,518, 5,226,112, 5,170,340 and 5,287,194. Some patents on this subject by others include U.S. Pat. No. 5,113,355, 5,113,494 (originally filed Feb. 27, 1987), 5,181,162, 5,220,674, 5,247,670; 4,953,080 and 4,821,107. Further by way of background, some of the following Xerox Corporation U.S. patents also include examples of networked systems with printers: U.S. Pat. Nos. 5,153,577; 5,113,517; 5,072,412; 5,065,347; 5,008,853; 4,947,345; 4,939,507; 4,937,036; 4,920,481; 4,914,586; 4,899,136; 4,453,128; 4,063,220; 4,099,024; 3,958,088; 3,920,895; and 3,597,071. Also noted are IBM Corp. U.S. Pat. Nos. 4,651,278 and 4,623,244, as well as Canon U.S. Pat. No. 4,760,458 and Jap. Pub. No. 59-63872 published Nov. 4, 1984. Some of these various above patents also disclose multi-functional printing systems.

Some other network system related publications include "Xerox Office Systems Technology" "Xerox 8000 Series Products: Workstations, Services, Ethernet, and Software Development" ©1982, 1984 by Xerox Corporation, OSD-R8203A, Ed. T. Linden and E. Harslem, with a "Table of Contents" citing its numerous prior publications sources, and an Abstract noting the April 1981 announcement of "the 8110 Star Informations System, A New Personal Computer . . ."; "Xerox System Integration Standard Printing Protocol XSIS 118404", April 1984; "Xerox Integrated Production Publishers Solutions: "Booklet No." 610P50807" "11/85"; "Printing Protocol-Xerox System Integration Standard" ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress: The Source Book", Simon & Schuster, Inc., New York, N.Y., 1988, by Harrington, S. J. and Buckley, R. R.; Adobe Systems Incorporated "PostScript" Language Reference Manual, Addison-Wesley Co., 1990; "Mastering Novell" Netware®, 1990, SYBEX, Inc., Alameda, Calif., by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) pp. 1214–1224, November, 1985; and "Apollo87 The Network Computing Architecture and System: An Environment for Developing Distributed Applications", T. H. Dineen, et al, Usenix Conference Proceedings, June 1987.

Noted regarding commercial network systems with printers and software therefor is the 1992 Xerox Corporation "Network Publisher" version of the 1990 "DocuTech®" publishing system, including the "Network Server" to customer's Novell® 3.11 networks, supporting various different network protocols and "Ethernet"; and the Interpress Electronic Printing Standard, Version 3.0, Xerox System Integration Standard XNSS 048601 (Jan. 1986). Also, the much earlier Xerox Corporation "9700 Electronic printing System"; the "VP Local Laser Printing" software application package, which, together with the Xerox "4045" or other Laser Copier/Printer, the "6085" "Professional Computer System" using Xerox Corporation "ViewPoint" or "Global-View®" software and a "local printer [print service] Option" kit, comprises the "Documenter" system. The even earlier Xerox Corporation "8000" "Xerox Network Services Product Descriptions" further describe other earlier Xerox Corporation electronic document printing systems. Eastman Kodak "LionHeart®" systems, first announced Sep. 13, 1990, are also noted.

Current popular commercial published "systems software" with LAN workstation connections include Novell DOS 7.0, "Windows®" NT 3.1, and IBM OS/2 Version 2.1.

All of the references designated in the above Background section are incorporated herein by reference.

SUMMARY OF THE INVENTION

In accordance with the present invention, there is disclosed a method for use in a printing system for producing copies or prints in which billing is developed for a customer of the printing system for said produced copies or prints on a basis of a set of accounting information accumulated and stored in an accounting subsystem. The printing system includes an input/output station communicating with the accounting subsystem by way of a network, and the method causes a set of billing/pricing information to be generated for transmission to a location selected by the customer or the printing system upon the occurrence of a selected event related to said printing system. The method includes the steps of: a) electronically receiving a subset of the accounting information at the accounting subsystem; b) in response to said electronic receiving of (a), electronically updating the set of accounting information; c) analyzing the updated set of accounting information to determine if said selected event related to said printing system has occurred; and d) when said selected event related to said printing system has occurred, transmitting automatically the set of billing/pricing information to the selected location.

DESCRIPTION OF ONE OR MORE PREFERRED EMBODIMENTS

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 6:
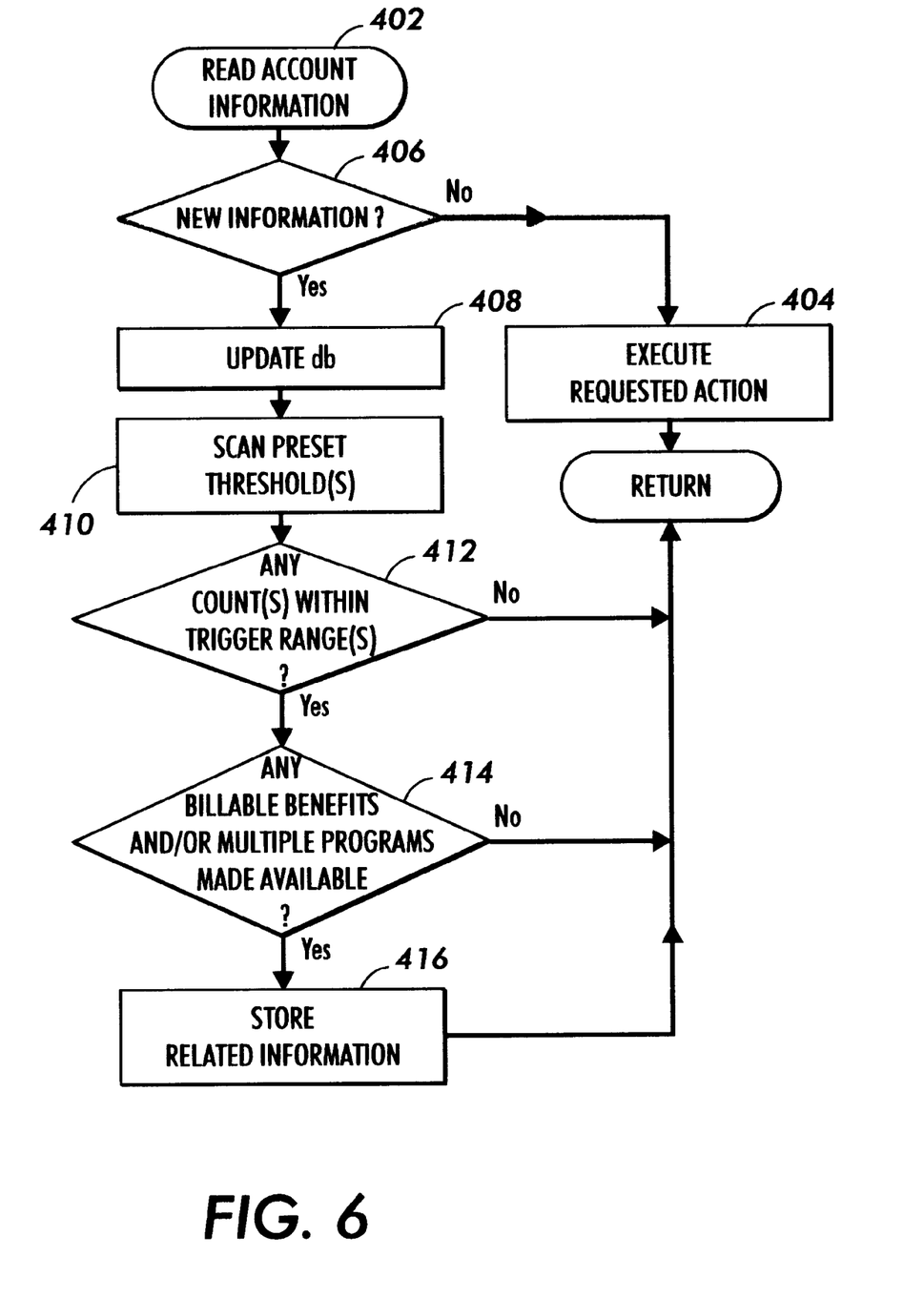
FIG. 6 comprises a flow diagram demonstrating an approach by which a print system broker manages account information delivered thereto by a customer client.
Figure 7:
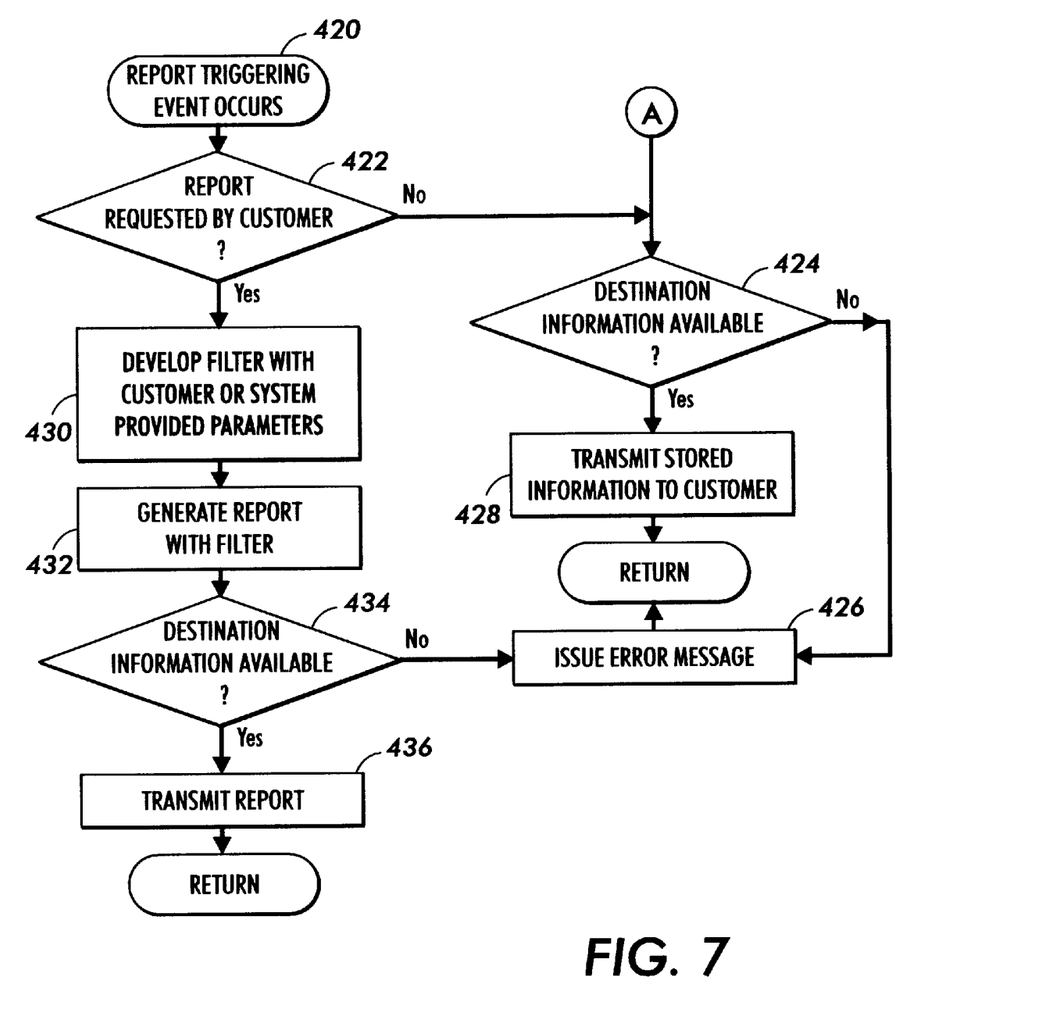
FIG. 7 comprises a flow diagram demonstrating an approach in which the print system broker transmits stored information automatically or provides a report in response to a request from the customer client.

Referring generally to FIGS. 6 and 7 of the drawings, there is shown the document services architecture 10 of the present invention. Document services architecture 10 is a layered architecture in which the functions performed are grouped into vertically ordered strati, referred to herein as layers.

Document services architecture 10 has three principal layers; namely, an applications layer 14, a resource layer 16, and a control layer 18. Referring specifically to FIG. 6, applications layer 14 enables access to a defined set of document services from either a remote workstation such as a Personal Computer (PC) 20 or host computer 22, or user access routines (Dialog) 24 resident with the architecture 10. Layer 14 has a document services section 26 which cooperates with the modules and facilities of resource layer 16 to provide the document services offered by the architecture. Document services section 26 includes capture service 30, management service 32, printing service 34, and finishing service 36. Layer 14 additionally incorporates an overriding service manager 40 that coordinates and controls access to and collaboration between the individual document services provided by service section 26.

Resident user access routines Server (Dialog) 24 provide for interaction with the document services 26 through a defined set of UI descriptions 27 and operation paradigms (services). These UI descriptions 27 include scan manager, file manager, print manager, make ready selections such as cut and paste, and other services as described more fully in U.S. Pat. No. 5,493,634 to Bonk et al., the disclosure of which is incorporated herein by reference. Remote workstations such as PC 20 would also enable access to the aforementioned services via similar UI descriptions 27' when programming work input. This set of UI descriptions and paradigms provide a consistent and spatially independent document management programming and usage model document environment (DocuSpace) 25 that is supported by the rest of the architecture.

Resource layer 16 performs the work described to it by document services section 26 of applications layer 14, and for this purpose has a collected set of software modules and facilities which are capable of being reused, combined, and distributed to provide a variety of services and products.

Resource layer 16 (FIG. 7) consists of three principal sections: a system controller 128; facilities 100, 116, 119 sequenced by the system controller to carry out the document services called for (i.e., capture 30, management 32, printing 34, finishing 36); and a data base 131 shared by the facilities. Database 131 contains the shared information upon which facilities rely. Further details regarding the structure and operation of a system state controller, suitable for use in with the preferred embodiment is provided in U.S. Pat. No. 5,170,340 to Prokop et al., the disclosure of which patent is incorporated herein by reference.

For capture service 30 of application layer 14 (FIG. 6), the facilities in resource layer 16 (FIG. 7) comprise an image input facility 100, data stream section 116, and application protocols 118. Image input facility has IIT controller 102 and Scan manager 104. IIT controller 102 is to control an attached or remote document scanner 105, and scan manager 104 to capture work in the form of raster (bitmap) image descriptions or documents, or operating instructions in the form of job programming. A data stream section 116 provides various Page Description Language (PDL) and data stream interpreters 117 for a selection of PDL and data stream such as Postcript™, Interpress, Laser Conditioned Data Stream (LCDS), Xerox™ Encoding Sequence (XES™), etc. that are available from the input source data description such as coming from PC 20 or host computer 22. The data stream section 116 captures work in the form of electronic documents, which, in turn, are logical sequences of page descriptions and associated structure information, or operating instructions, in the form of printing instructions and/or finishing instructions.

Application protocols 118 are standard communication applications appropriate to a document service such as printing, filing, network, name dereferencing, etc. that are available in a variety of communication suites such as Xerox™ Network Services (XNS™), International Standards Organization (ISO), etc. The transport protocol stacks 119 have protocol layers 1–6 that represent basic mechanisms for moving data between computing or communicating systems for the variety of communication suites. The architecture provides for a logical separation and automated binding between the Application protocols 118 of resource layer 16 and transport protocol 119 stacks of control layer 18. This allows arbitrary routing and mix and match of the applications to the transport stacks for the various communication suites.

For printing services 34 of application layer 14, the facilities provided in layer 16 comprise a font selection library 112, make ready section 114, and imager section 122. Font selection library 112 provides interpreters for various font formats such as FIS, Type I, F3, etc., and a font manager 110 that allows fonts in any format to be used interchangeably. Make ready section 114 supports pre-press and system xerographic operations and provides various service selections and options such as signatures, merge, cut and paste, etc., as noted in the aforecited Holt application.

Imager section 122 performs the necessary manipulation of image or page descriptions obtained via the capture service 30 of layer 14, combining the page descriptions with the data obtained from the font manager 110 or the environment (database) 131 to produce the final form data suitable for use by the Make ready section 114, or suitable for use by Image Output facility 115, or suitable for transmittal to and use directly by an Image Output Terminal (IOT) 121, or suitable for exporting to another system. Having a single shared Imager section 122 that is logically separate from the data stream section 116 allows for consistent imaging across the PDL and data stream interpreters 117, across various Image Output Terminals (IOT) 121 and between systems. A single shared imager 122 also facilitates integration of new interpreters 117 and allows for intermix of PDL and data streams within a document (compound document).

For finishing service 36, the image output facility 115 consists of the IOT controller 126 and marker 130. The former is for controlling the attached or remote Image Output Terminal (IOT) 121, the latter for producing the prints (documents) programmed.

The Image Output Terminal (IOT) 121 may be any suitable marking device such as a laser printer, ink jet printer, etc. The IOT 121 may also include finishing facilities such as sorting, stapling, binding, signatures, etc., which are also accessed/managed by the Image Output facility 115, on behalf of the finishing service 36 of document services section 26.

For management service 32 of application layer 14, the facilities in the resource layer 16 comprise the system controller 128, applications protocols 118, and font manger 110. System controller 128 provides access to and management of most system resources and database objects directly, while application protocols 118 provides remote access to the management service from either a PC 20 or host computer 22 via standard protocol mechanisms. Font manager 110 provide access to and management of the systems fonts.

Control layer 18 provides a virtual machine for server platforms as described in the above-mentioned Prokop patent, using standard commercial processor platforms 200 and standard and/or custom I/O cards 204, 206 for processing options. An industry standard operating system 208 such as UNIX is used with special custom supplied extensions to enable real time and multi-processing. Resource controller 210 of layer 18 coordinates bandwidth and resource access between the independent facilities.

System controller 128 of resource layer 16 coordinates operation of the facilities in resource layer 16 to accomplish the service called for, to enable concurrent operation, and to manage the productivity of the system through scheduling of the various facilities in layer 16 in cooperation with a resource controller 210 in control layer 18. Controller 128 controls facility resource management, job management, and the sequencing of job steps, the latter by scheduling the job steps in the work queues 133 of layer 16 associated with the particular facility used.

In the case where an operator decides to scan and print a document, system controller 128 creates a new job as described to it by applications layer 14 mediating with the operator via a remote workstation such as PC 20 or host computer 22, or through user access routines (Dialogs) 24. System controller 128 creates a plan for the job, specifying the various facility sequencing required to carry out the job. A set of priorities for the resources such as I/O bandwidth, physical memory, etc. is planned. To execute the plan, system controller 128 places work requests, representing the job steps, in the work queues 133 of the facilities required to perform the job. When a facility becomes idle, the facility accesses the work queue for that facility and selects the next work request to execute. If necessary due to priorities, control layer 18 redistributes the resources.

System controller 128 formulates a plan for each job similar to an assembly line. In executing the plan, controller 128 places the work requests in the appropriate work queues 133 for the facilities that will perform the work. Each facility draws the work requests from the work queue of the facility, accesses the appropriate database 131, and performs the appropriate operations. When completed, the facility places the results in the appropriate database and notifies system controller 128 that the work is completed.

System controller 128 exercises both general resource control and specific control over the work items by manipulating the work queues. For example, controller 128 may prohibit a facility from taking items from the facility's work queue, thereby freeing resources that would be used by that facility for use by other facilities.

Once a facility has work in the facility's work queue, operating system 208 examines its priorities to decide which facility's work to execute at any given moment. As the job progresses, controller 128 may modify the relative priorities of the facility's work. In the event controller 128 does this, controller 128 notifies resource controller 210 which then parcels out the needed resources accordingly.

In one example, scan section 100 places image data obtained from scanning in the database 131 and notifies the system controller 128 that scanning is completed. Controller 128 then places a print work item in the print facility's work queue, and the print facility (i.e., marker 130) generates the print output using the scanned in image data from database 131.

Capture service 30 and make ready service 114 are accessed directly through resident user access routines (Dialog) 24. PC 20 and host computer 22 access are not provided nor is selection of print and finishing services 34, 36 respectively. In this embodiment, document scanner 105 serves to capture the work while make ready section 114 supports the necessary pre-press and system xerographic operations.

The architecture is well suited for use as a network printing service that is accessed either remotely from host 22 or directly through resident user access routines 24.

Figure 1:
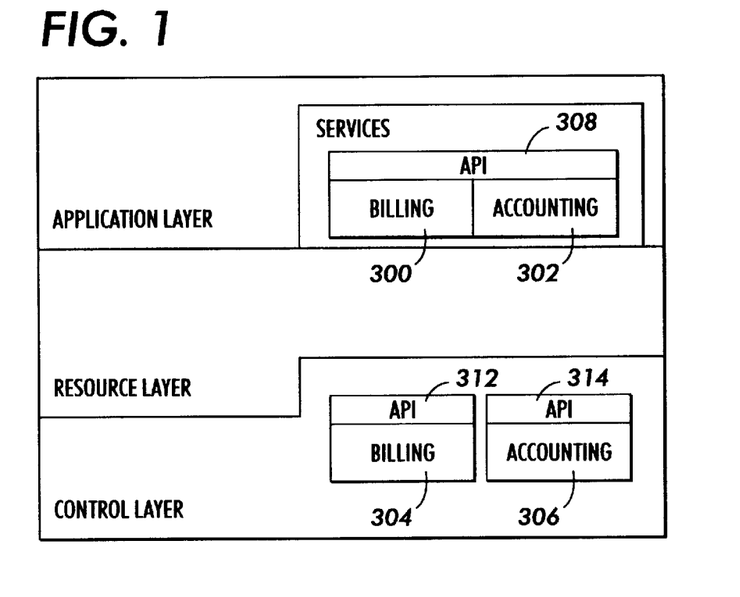
FIG. 1 is a schematic block diagram of a layered document services architecture including systems for providing billing and accounting services for a job upon which selected functions are performed.

Referring to FIG. 1, the architecture of FIGS. 6 and 7 is preferably provided with billing and accounting functionality. In the illustrated embodiment of FIG. 1, a billing input subsystem 300 and an accounting input subsystem 302 are provided in the Services System of the Application Layer 14 so that a user can communicate with the billing application 304 and the accounting application 306, both of which billing and accounting applications are preferably disposed in the Control Layer. In practice, a user communicates with the subsystems 300 and 302 by way of interface 308, the interface 308 comprising, in one example, a suitable application programming interface ("API"). It will be appreciated by those skilled in the art that while a single API is shown for access to the subsystems 300, 302, a dedicated API could be provided for each of the subsystems 300 and 302. Use of one API for subsystem 300 and another API for subsystem 302 provides certain advantageous results, e.g. with dedicated APIs, one of the two APIs can be deleted without deleting the other API. The user and various event generators communicate with the applications 304 and 306 by way of respective interfaces 312 and 314. As will appear, the billing and accounting applications process information received from the Application and Resource Layers.

Figure 2:
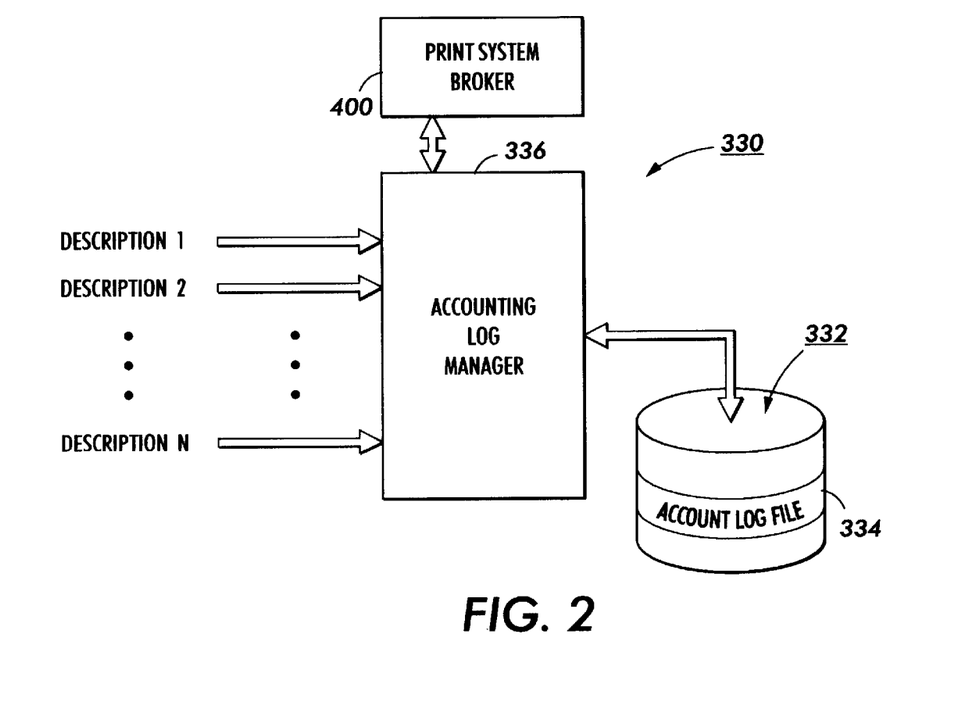
FIG. 2 is a block diagram of an accounting system embodying, in part, the present invention.

The structure of an accounting system is designated, in FIG. 2, with the numeral 330. It will be appreciated that much of the system 330 is implemented by way of accounting application 306 (FIG. 1). The system 330 includes a block of mass memory 332 which includes a configurable account log file 334. Descriptions 1, 2, . . . N, as discussed in further detail below, are provided by, among other sources, various subsystems of the resource layer 16, which resources may be distributed across local and/or wide area network(s). As will appear from the discussion below, a request associated with each description is executed with an accounting log manager 336.

Figure 3:
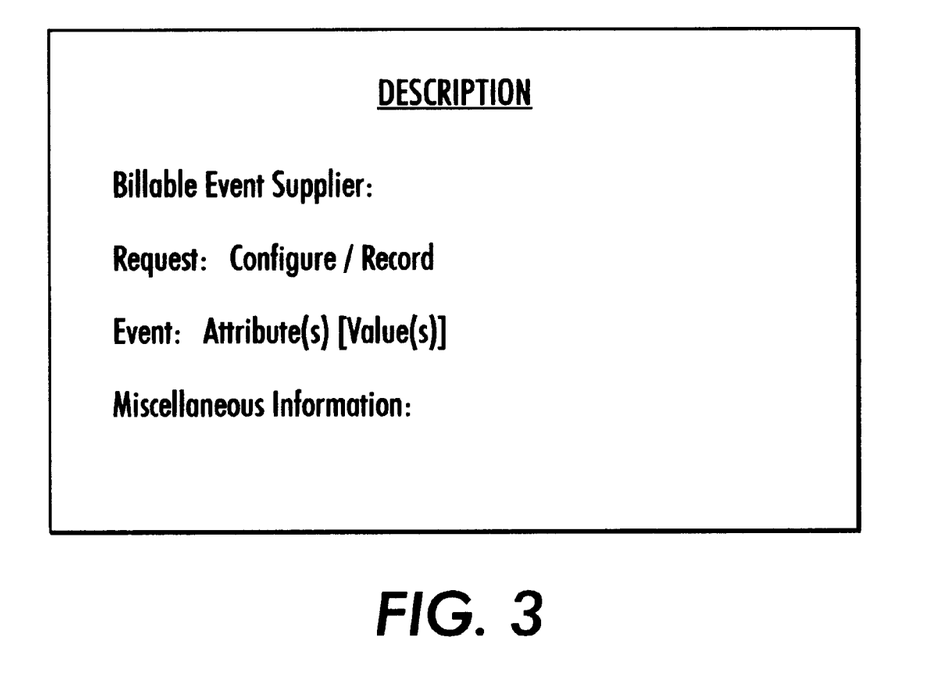
FIG. 3 is a schematic view of an electronic description used in conjunction with the accounting system of FIGS. 1 and 2.

Referring to FIGS. 3 and 7, each time a selected subsystem performs a function relative to a given document, the manager or controller associated with the selected subsystem generates an electronic description of the function, designated in FIG. 3 by the numeral 337. In the electronic description, which for ease of discussion is shown as a printed sheet, the subsystem which is responsible for performing an accountable function is referred to as the "billable event supplier". In practice, a billable event supplier provides information, referred to in FIG. 3 as a "request" for configuring the accounting system, in accordance with the information provided by way of "event" and/or miscellaneous info[rmation], or entering/recording account information in an account, along with a suitable job indicator, to reflect the extent to which consumables or services are employed by a system user. As should be recognized, the job indicator can either be provided by way of a separate entry in the description or as miscellaneous information.

Figure 4:
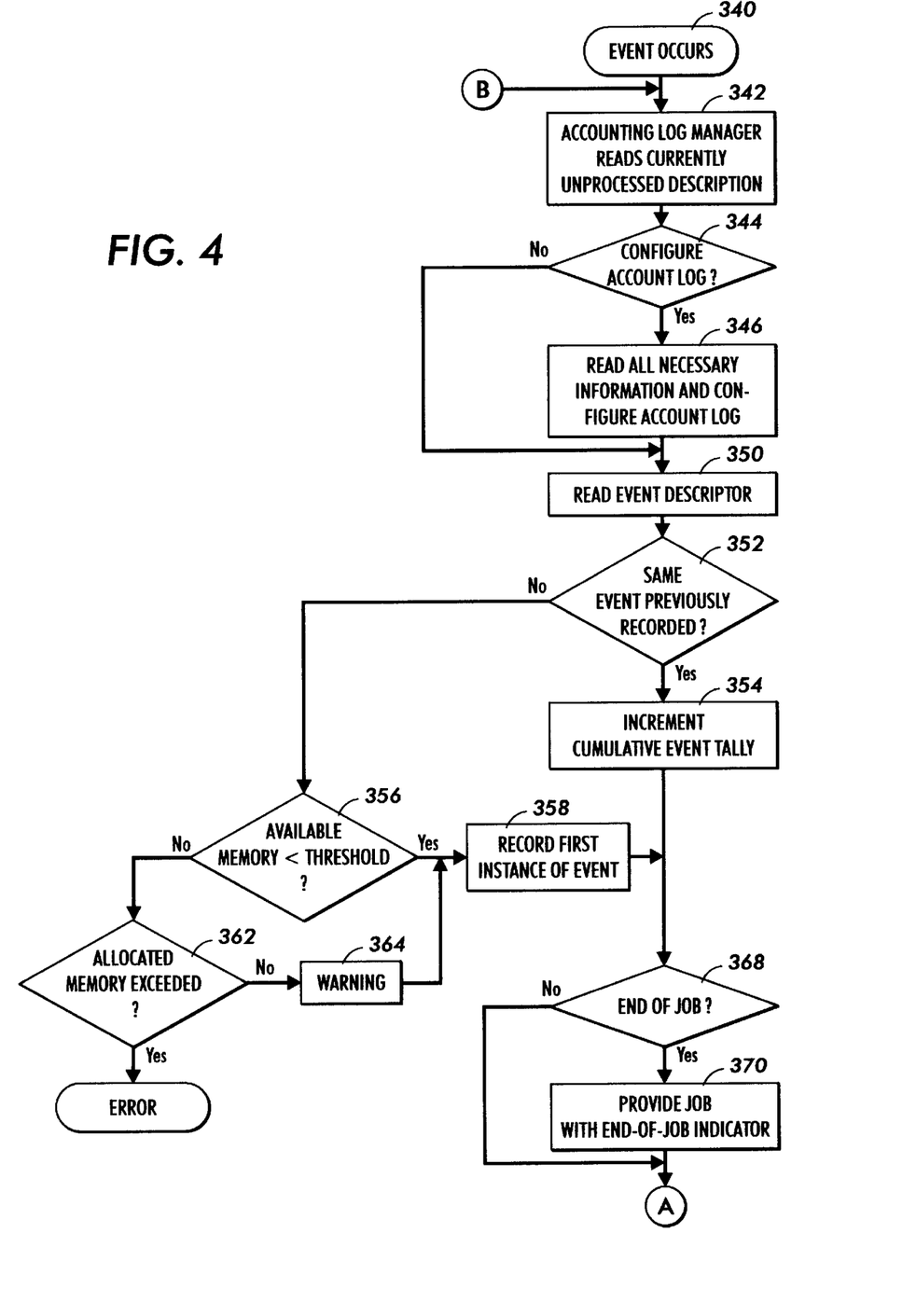
FIGS. 4 and 5 comprise a flow diagram demonstrating operability of the accounting system of FIGS. 1 and 2.
Figure 5:
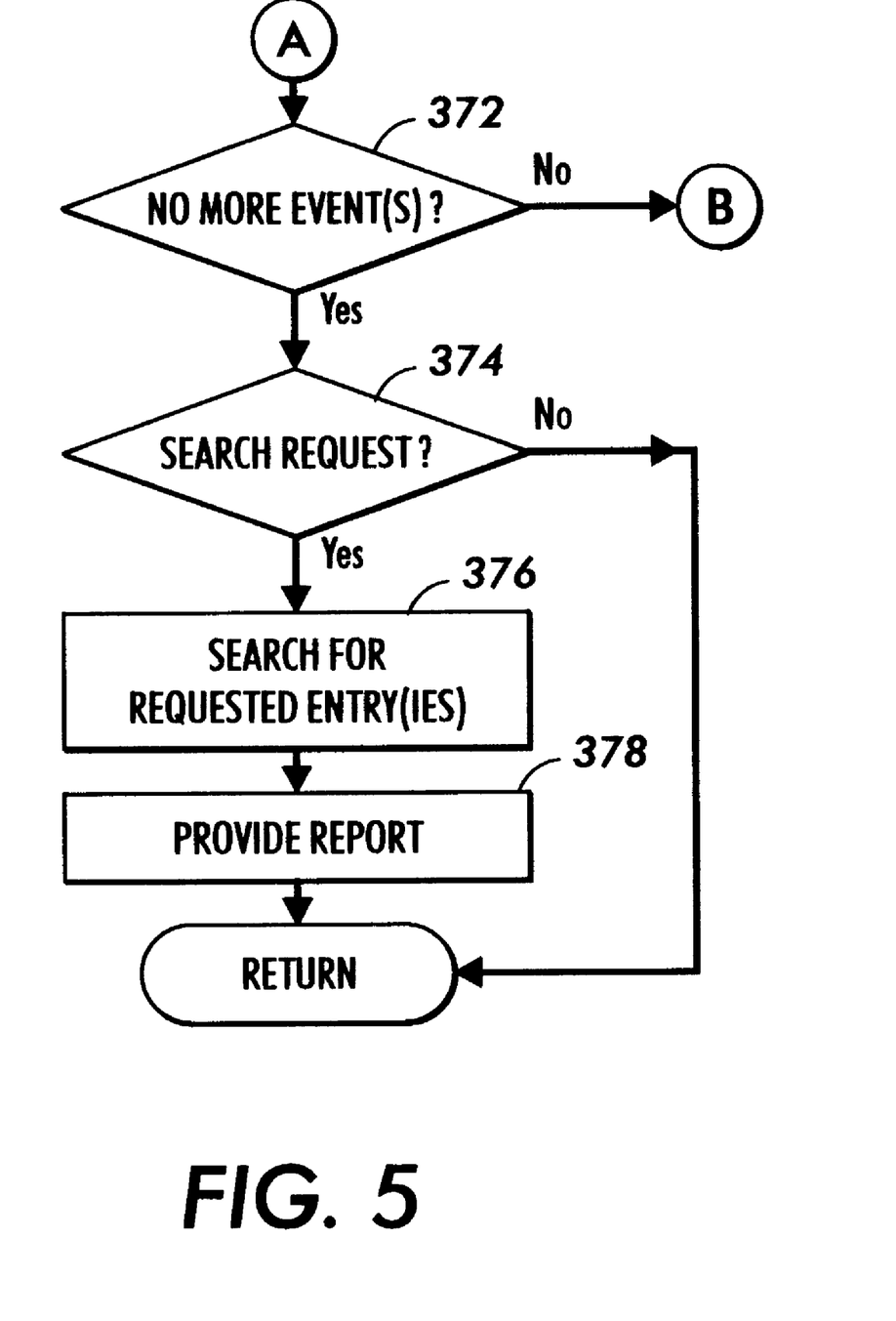

A comprehensive understanding of the functionality of the accounting system of FIGS. 1–3 can be obtained by reference to the flow diagram of FIGS. 4 and 5. In particular, an event, such as the scanning of a hardcopy page or the imaging of image data onto a substrate, occurs at step 340. In turn, the billable event supplier generates a description 337 and sends it to the accounting log manager 336 (FIG. 2). In response to reading the description (step 342), the accounting log manager determines whether the description calls for configuration of the account log (step 344) or the accumulation of account information. In the illustrated embodiment of FIG. 4, it will be assumed that the initial answer to the query of step 344 is in the positive and that the account log file requires configuring. It should be appreciated that configuring of the file is not required on a regular basis. Nonetheless, as will appear, reconfiguring of the file may be required to accommodate for system demands.

Assuming that configuring is required, information for facilitating configuration of the account log is read at step 346, by the accounting log manager. In the preferred embodiment, such information, which is provided by way of the description 337 (FIG. 3), provides direction as to memory allocation and whether the accounting system is to be enabled or disabled.

As should be appreciated, flexibility in system operation is increased when the accounting system can be "taken off line". Additionally, the configuration information, in one example, includes a path to the account log.

After performing all of the requested configuration operations, the accounting log manager 336 reads the event descriptor of the description 337 (step 350) and determines, by way of step 352, whether the event described by such descriptor has already been recorded in the account log file 334 (FIG. 2). Using step 352, it is determined whether a record of a first instance of an event is to be formed or whether a preexisting record is to Is be incremented for indicating a cumulative tally.

Assuming that the event represents an event that is cumulative for the job currently in process, then the fact that the event has occurred multiple times for the same job is reflected in a cumulative tally (step 354). It will be appreciated that a cumulative value may be received from a billable event supplier in which case the need to increment or accumulate at the accounting manager, for a given event type, may be unnecessary. Even within a given entry of the configurable account log, it may be preferable to accumulate certain information (e.g. add to stock count) while replacing other information (e.g. replacing state information).

To comprehend the meaning of an accountable event, the following example should be instructive. In one instance, a particular type of toner A is imaged on a given stock B at a resolution C. This instance of imaging may be viewed as the event A, B and C for purposes of accounting. When this instance of imaging is first encountered, a record of A, B and C, subject to the constraints of steps 356, 358, 360 and 362, is made in the account log file and labeled with the provided job identifier. In turn, when another event descriptor indicates that the same A,B and C event has occurred again for the job currently being processed, the record of A, B and C is incremented to provide a cumulative event tally. In one example, a job identifier may be unique with respect to each instance for processing of a corresponding job, e.g. a first job identifier may reflect the processing of a job during one time interval while a second job identifier may reflect the processing of the same job during another time interval.

Assuming that the event represents an event that is occurring for the first time, a determination is made, at step 356, as to whether memory, made available through the allocation in step 346, has been used beyond a preset threshold (e.g. 80% of available memory). If the threshold has not been exceeded, then a record of the first instance of the event is recorded via step 358. On the other hand, if the threshold has been exceeded, then a determination is made, at step 360, as to whether all of the allocated memory has been consumed. If all of the allocated memory has been consumed, then an error routine is initiated—and more memory space may be allocated to the accounting system— other wise, a warning is provided (step 362) and the process executes step 358.

Assuming that the process proceeds through step 354 or step 358, it is determined, at step 368, whether the accounting for an instance of a job has been completed. If the end of a job instance has been reached, then, at step 370, an end-of-job indicator is stored by the accounting log manager 336 (FIG. 2); otherwise a check is performed as step 372 (FIG. 5) to determine if any more events have been received by the accounting log manager. The provision of end-of-job indicators is advantageous to the approach of the preferred embodiment in that accounting events are grouped in terms of a job occurrence. In other words, the end-of-job indicator provides information about when the processing of a job (instance) is completed. It follows that the accounting system could also be used to collect information regarding when the processing of a job commenced. In this manner, after a job is processed, a user, through use of beginning-of-job/end-of-job indicators can determine the times corresponding with the processing of a job instance. As will be appreciated, a given job original or master may be printed at various times during a given time interval (e.g. a month) and it may be useful or even necessary to gather information about the number of instances in which the job has been processed during such given time interval.

Referring again to step 372 (FIG. 5), if another event is to be reviewed by the accounting log manager, then the process loops back to step 342 (FIG. 4) to read another description. Assuming, however, that no events are pending, the accounting log manager determines, via step 374, whether a search request is pending. A search request comprises a request from a system user to obtain all of the entries for the given instance or instances of an executed job. It will be recognized that, preferably, the accounting log manager would not consider giving out such information without obtaining some sort of suitable security clearance. Under the appropriate conditions, the accounting log manager searches for entries for one or more instances of a given job based on the information provided by a user, such as security indicator, job identifier and time interval over which the search is to be performed. With this information in hand, the accounting log manager performs the search (step 376) and provides a report (step 378) that includes all of the requested entries for the given job. From the discussion above, it will be appreciated that many of the entries will be grouped together in one or more cumulative records thus making the report, at least in some instances, relatively brief in length.

In brief, the above-described accounting system provides an open interface for any facility to report accounting information specific to its functionality. This is accomplished through mechanisms, such as common dictionary utilities (found in Xerox' DocuSP (Ver. 1.0)) or other forms of name-values pairs. Received accounting information is queued and processed as received by an update component which appends the information to a persistent storage area. It should be appreciated that the present accounting log system is designed to serve an unlimited number of facilities across LANs and WANs. Moreover, the identifiers from such facilities would, at least in one example, reflect uniquely the origin of a given job.

Postcript is a Trademark of Adobe Corporation.

Xerox and all Xerox Products referred to herein are Trademarks of Xerox Corporation.

UNIX is a Trademark of AT&T Bell Laboratories.

Referring again to FIG. 2, a print or document processing system broker ("Broker") is designated with the numeral 400. While the Broker is shown as being separate from the accounting log manager 336, in practice the Broker 400 and the accounting log manager would be implemented as an integrated system. As will appear from the discussion of FIGS. 6–11 below, the Broker 400 provides the above-described accounting system with a high degree of intelligence, which intelligence provides a host of advantageous information to network clients or users with which the Broker communicates.

It is worth noting that the broker 400 can be used interchangably with the billing system 330 shown in FIG. 3 of U.S. patent application Ser. No. 08/657,716 filed by Krist et al. on May 30, 1996, the disclosure of the '716 Application being incorporated herein by reference.

Referring specifically to FIGS. 2 and 6, a process for further managing account information communicated to the system 330 is discussed. As should follow from the above description, the system 330 can receive at least two types of account related ("account") information, namely configuration information or information relating to an accountable event. Referring specifically to FIG. 6, account information is read at step 402 (equivalent to step 342 in FIG. 4) and if the information received is configuration information (see step 406), then the process performs a requested action at step 404, provided the requester possesses an appropriate level of security clearance. Assuming, on the other hand that the incoming information relates to an accountable event (see step 406), then a suitable database (implemented, in one example, with the account log file 334) is, via step 408, updated.

In one preferred embodiment, the broker 400, or the accounting log manager 336, scans the values or counts in the database of mass memory 332 (FIG. 2) (step 410) to determine, via step 412, current threshold levels corresponding therewith. As should be appreciated, when a given threshold exceeds a reference level, then a "trigger range" may be encountered. As contemplated herein, one or more ranges are preset by a system administrator or the like. Assuming that at least one trigger range is encountered, it is further determined, at step 414, whether any billable benefits and/or additional programs are made available as a result of encountering the trigger range(s).

In one example, a billable benefit or discount may occur when a page copy number exceeds a given page count level. Accordingly, to encourage the customer to exceed the given page count level and obtain, the discount the system 330 could notify the customer in advance of the possibility of exceeding the given page count. In another example, an alternative billing plan may exist for users who access certain services on a relatively regular basis. For instance a customer who starts using a particular service (e.g. a highlight color service) on a relatively regular basis may be eligible for a different billing plan than another user who accesses the service on a relatively irregular basis. At step 416, information about either a billable benefit and/or an available program is stored in the mass memory 332 for future access by the client.

Referring to FIG. 7, a process for reporting a triggering "event" is discussed. As will appear, the process of FIG. 7 takes advantage of the information stored at step 416. Moreover, the word "report" is used in its broadest sense and may apply to any document generated as a result of information provided by the system 330. Referring to step 420, when a report triggering event occurs, it is determined, via step 422, whether the report is being generated as a result of the system automatically developing information (see steps 414 and 416 of FIG. 6) or the customer requesting a report.

If the system develops the information in response to the detection of a selected event (e.g. the approaching of a given page count) then the process proceeds to determine, via step 424, whether a location for receiving the information has been provided. Various approaches for providing the location are contemplated by the present embodiment. In one example, the system includes an operating system supporting "Microsoft Mail for Windows (version 3.2)". As is known, this mail application includes a directory in which appropriate E-Mail addresses can be stored. In practice, documents are transmitted conventionally across a network by reference to these addresses. If no mechanism for transmitting information to a particular user is provided, then a message is issued with step 426. If information can be communicated to the particular user, however, the system accesses the information stored with the process of FIG. 6 (see step 416) and transmits the same, via step 428, to the customer.

Referring again to step 422, the report may be requested by the customer. In this event, the system permits the customer, at step 430, to provide parameters for the sake of developing a report filter. Some report option parameters may include the following:

Organization: Budget Center, Department

Period: Daily/Monthly/Yearly/Period to Date

Equipment Population: Printers/Copiers

Trend: Historical/Forecast/What If . . .

Event: B & W/Color/Highlight Color/ . . .

Output: Print/Fax/Other Electronic

If no parameters are provided, then default parameters may be generated to accommodate for known requirements of the customer.

At steps 432 and 434, the system develops the report filter based on perceived customer requirements and then generates the report using such filter. As can be appreciated, the filter is used to "pull" required information from the above-mentioned database associated with the mass memory 332 (FIG. 2). A destination check similar to that made at step 424 is made at step 428. If no destination information is made available, then an error message is issued with step 426; otherwise, a report using information developed, at step 436, with the filter is provided to the customer.

Figure 8:
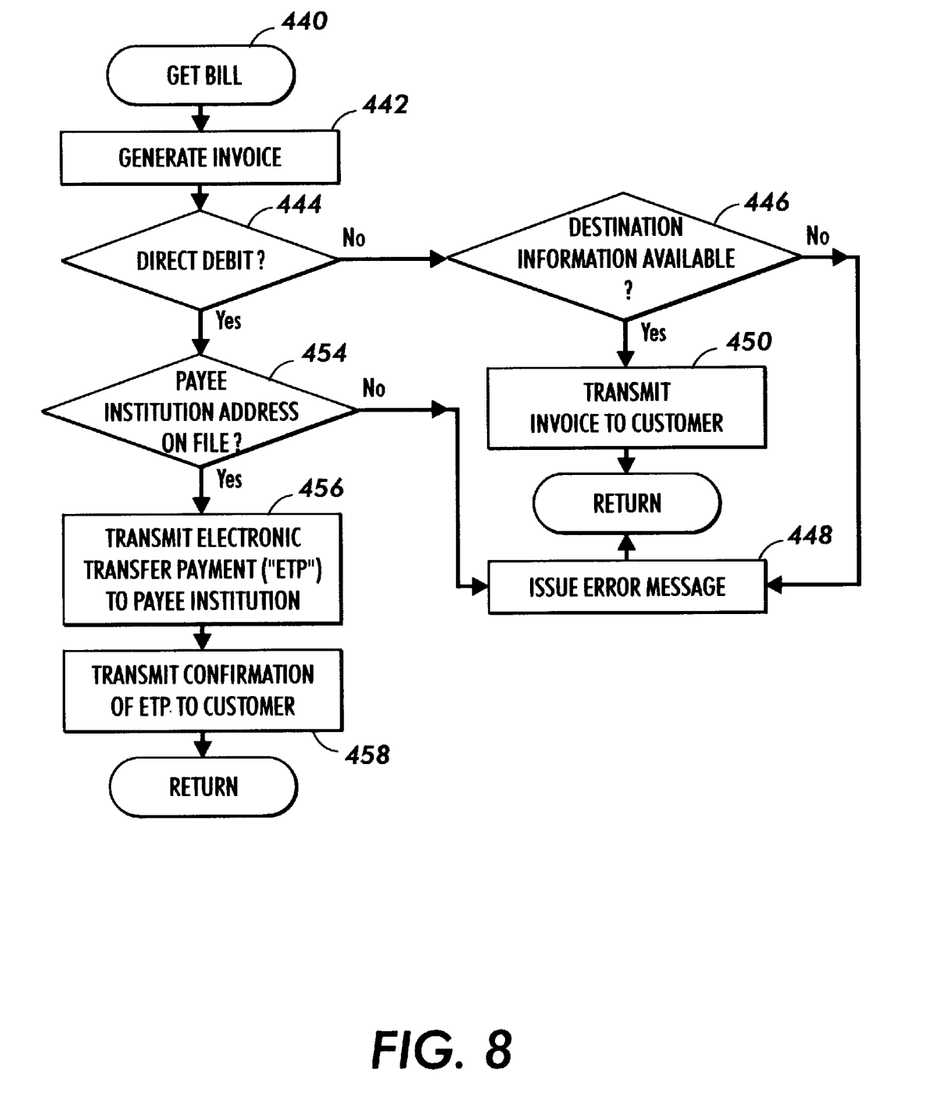
FIG. 8 comprises a flow diagram demonstrating an approach in which the print system broker facilitates both the generation of an invoice and the transmission of such invoice to a location selected by the customer client.

It will further be appreciated that a report can assume the form of a bill for services and/or goods. This sort of bill or invoice is of particular value in the copier/printer market where machine customers or users often use one or more machines on the basis of a lease. Referring to FIG. 8, another process for generating a report in the form of a bill is shown. To initiate the illustrated billing routine of FIG. 8 a "GetBill" step is initiated at 440. In response to the GetBill call, an invoice, based on the accounting information stored in the account log file 334, is generated at step 442.

It should be recognized that the bill can reflect use either by multiple users (FIG. 9) and/or at multiple machines. In the illustrated embodiment of FIG. 9, a plurality of printing subsystems ("PSS_s" communicate with a rate setting client ("RSC"). Any one of the machines may be shared by multiple customers ("CC_s"). Furthermore, a single customer (CC1 in FIG. 9) may communicate with multiple machines. Thus an invoice may reflect various relationships between customer(s) and machine(s). In the example where a customer uses multiple machines, information regarding the customer's use with respect to multiple PSSs would be stored in the system 330 (FIG. 2). That is, multiple machines would report use information about CC1 to the accounting log manager 336 or the broker 400 so that corresponding information regarding CC1's multiple usage would be stored in the account log file 334.

As contemplated by step 444, the bill can be communicated to one of two locations, namely to the customer or to a payee institution (e.g. bank) predesignated by the customer. Assuming that the bill is to be communicated to the customer, the process determines, via step 446, whether destination or location information is available for the customer. If no destination information is currently on record, then an error message is issued at step 448; otherwise the invoice generated with step 442 is, at step 450, transmitted to the customer.

If the bill is to be communicated directly to a payee institution designated by the customer, a check is performed, at step 454, to ascertain whether the customer has provided an address for the designated payee institution. Provided an address has been provided, an electronic transfer payment ("ETP") is transmitted, via step 456, to the designated payee institution. Essentially, the ETP facilitates paying of the bill by, in one example, directing the payee institution to withdraw a sum certain from an account of the customer. Subsequent to directing the payee institution with the action of step 456, a confirmation including, for example, a copy of the ETP, is transmitted, at step 458, to the customer.

As should appear from the discussion above, the accounting system 330, as shown in FIG. 1, operates in conjunction with a billing system. As should further appear from this discussion, billing information, in a wide variety of examples, varies as a function of accounting information. Thus it is useful to provide the accounting system of FIGS. 1 and 2 with update information at appropriate intervals. In another embodiment, the broker 400 would be employed with the billing system of U.S. patent application Ser. No. 08/657,716 filed by Krist et al. on May 30, 1996 to accommodate for updates. The term "update information" as used herein can refer to many types of information. For instance, an update may include a change in rates, cost factors, thresholds and/or volume discount rates.

Figure 9:
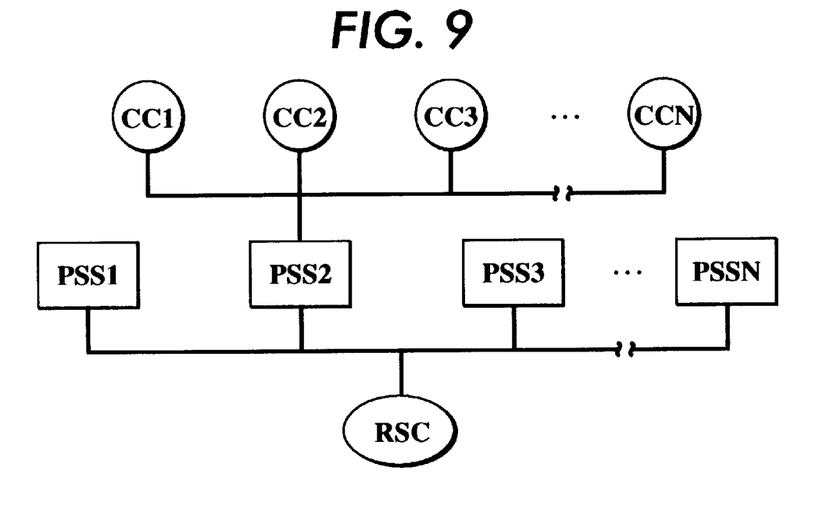
FIG. 9 is a block diagram of a network based document processing or print system in which a rate setting client ("RSC") communicates with a group of printing subsystems ("PSS_s") and one of the PSSs communicates with a plurality of customer clients ("CC_s")
Figure 10:
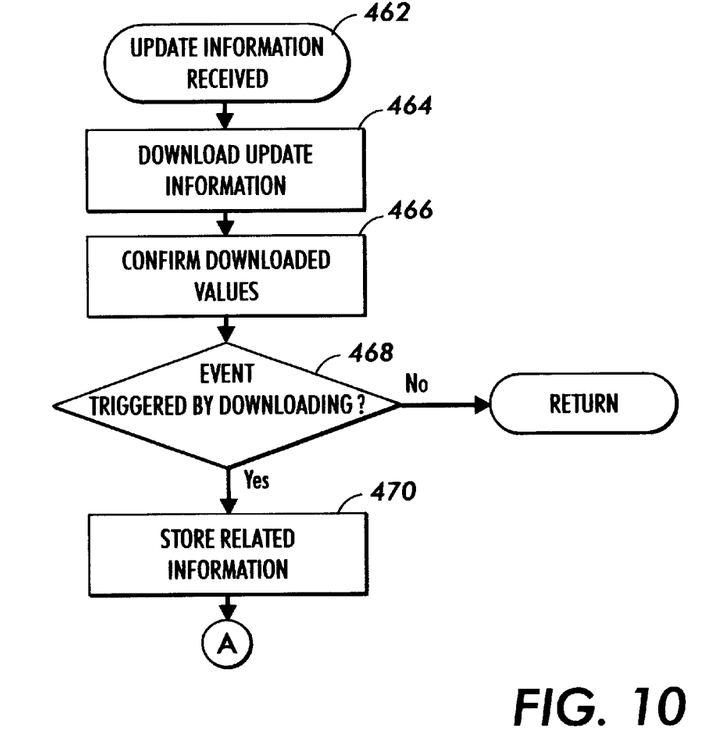
FIG. 10 is a flow diagram demonstrating an approach in which the print system broker stores information generated as a result of downloading update information.

Referring now to FIGS. 9 and 10, one approach for managing update information is described. In the illustrated embodiment of FIG. 10, update information is provided by the rate setting client FIG. 9 (step 462) to, among other recipients, the accounting system 330 (FIG. 2) or a printing subsystem (FIG. 9). Per step 464, the update information is cascaded to all those affected by the same. In one example, as implied by step 466, values will change in one or more locations as a result of the cascading of the update information. After the value changes have been confirmed (step 466), it is determined, via step 468, whether an event has been triggered as a result of downloading the update information. It is contemplated that any changes which might impact a user or customer is stored (step 470) for eventual transmission to such user or customer (See FIG. 7 for example of a subroutine for developing and transmitting a report).

Figure 11:
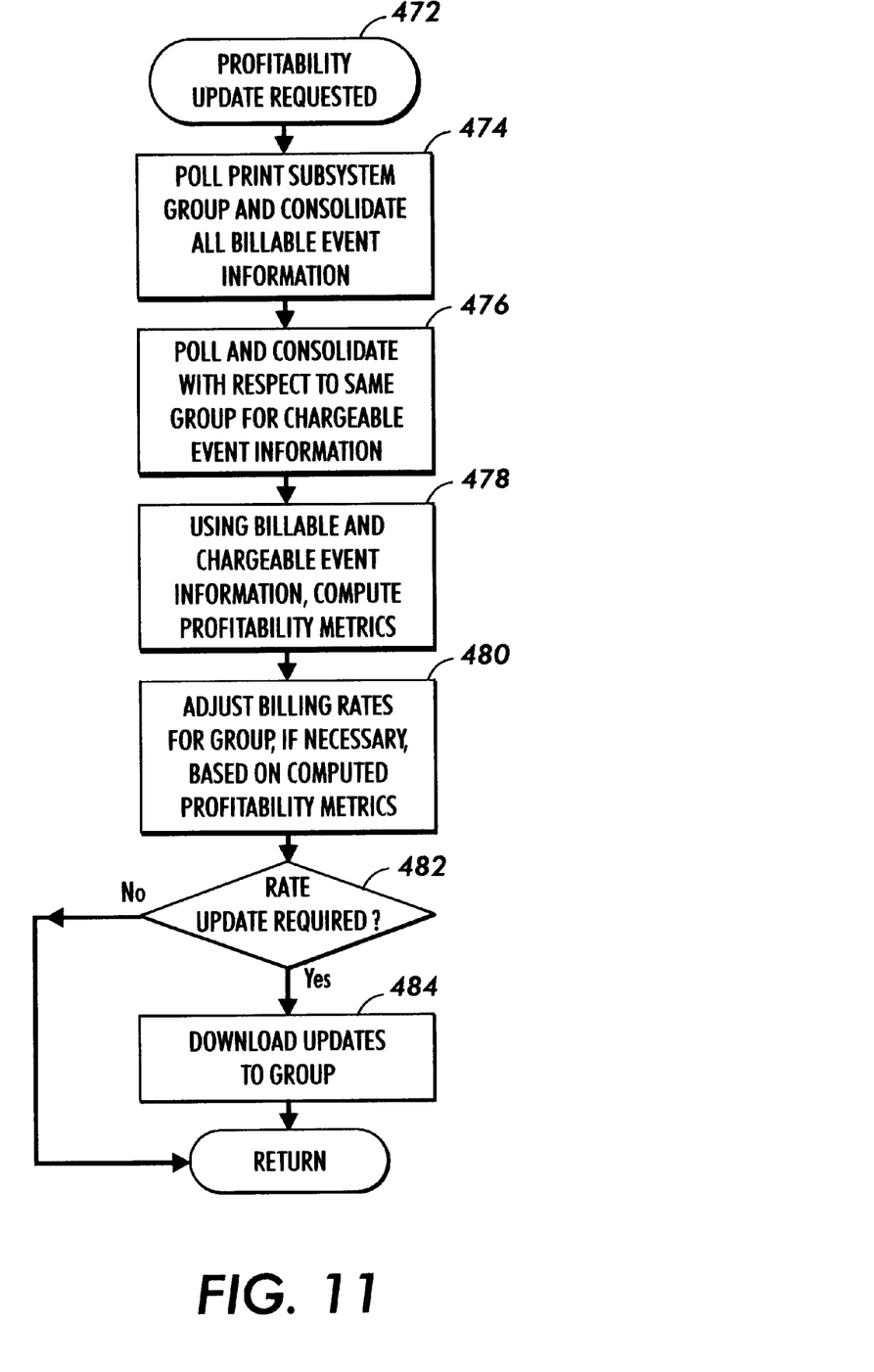
FIG. 11 is a flow diagram illustrating a technique for setting a billing rate on the basis of the profitability metrics of the group of printing subsystems.
Figure 12:
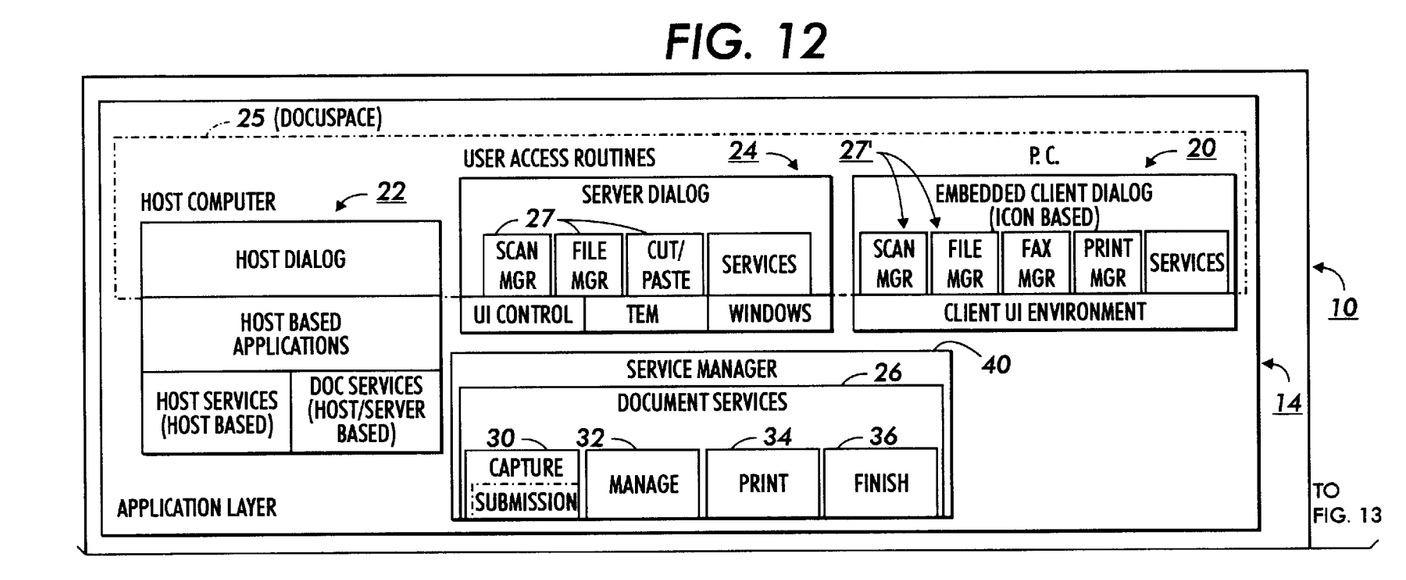
FIGS. 12 and 13 represent a schematic block diagram of the document services architecture in which subsystems associated with various layers are shown.
Figure 13:
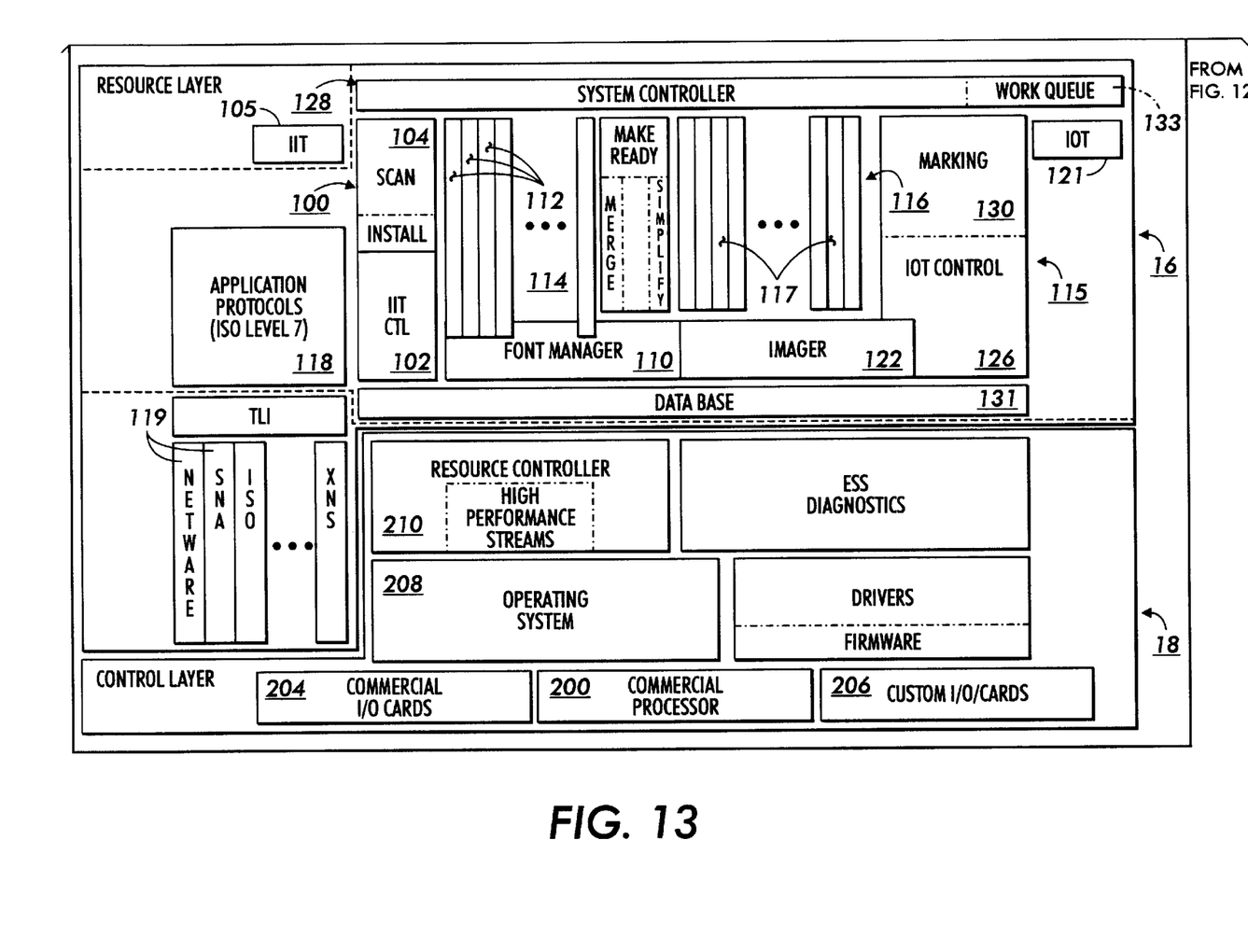

Referring to FIGS. 9 and 11, a program for adjusting billable rates in a document processing system of the type shown in FIG. 9 is described. As will appear, if the rate setting client (RSV) determines that a subsystem group (e.g. one or more printing subsystems) is not profitable, then the approach of FIG. 11 allows for suitable rate adjustment. More particularly, at step 472, the RSV launches a profitability application. In turn, the profitability application causes, at step 474, a polling of the subsystem group to be performed to obtain all appropriate billing information. Essentially, step 474 permits an assessment of the degree to which the users of the pertinent group have paid for usage of one or more subsystems. Conversely, step 476 permits an assessment of the base cost incurred as a result of subsystem usage. Using the information from step 474 and 476, profitability metrics for the subsystem group can be determined by way of step 478. In view of the determination at step 478, billing rates can be adjusted, if necessary, at step 480. Under certain circumstances it may be desirable, in view of action taken at step 480, to communicate a rate update to one or more subsystems associated with the group. When the outcome of step 482 is in the positive, update values are communicated, at step 484, to each subsystem associated with the group for suitable downloading.

Numerous features of the above-described embodiments will be appreciated by those skilled in the art:

First, a system is provided in which a broker tracks incoming account related information, at an accounting system, to determine if any billable benefits and/or multiple programs will be made available to a user as a result of his/her future use of one or more subject subsystems. Any information regarding billable benefits and/or available programs is stored for transmission to the user by way of a report. In view of the report, the user can accommodate his/her usage of the one or more subsystems to fully exploit the billable benefit and/or the now available programs.

Second, the broker can generate an invoice automatically for transmission to the customer or a payee institution. In the event of transmitting the invoice to the payee institution, an electronic transfer payment ("ETP") is communicated to the payee institution for the sake of directly debiting the customer's account. In turn, a copy of the ETP is provided to the customer to confirm the debiting transaction.

Third, with respect to a subsystem group, the broker can provide customers with notice as to when they will be subject to a rate change. In one example, a subsystem group communicates with a rate setting client ("RSC") and, when the RSC becomes aware of certain update information, the RSC causes such information to be cascaded throughout the subsystem group.

Finally, the broker can adjust usage fees charged within the subsystem group through a profitability assessment. In particular, through suitable polling of the subsystem, the broker can assess profitability metrics of the subsystem group and determine whether the current rates charged within the group are appropriate.

We claim:

1. In a printing system for producing copies or prints in which billing is developed for a customer of the printing system for the produced copies or prints on a basis of a first set of information accumulated and stored in an accounting subsystem, and in which billing is developed normally on the basis of a first billing plan, the printing system including an input/output station communicating with the accounting subsystem by way of a network, a method for causing a second set of information to be generated for transmission to a location selected by the customer or the printing system upon the occurrence of a selected event related to the printing system, comprising:

a) electronically receiving a subset of the first set of information at the accounting subsystem;

b) in response to said electronic receiving of (a), electronically updating the first set of information;

c) analyzing the updated first set of information to determine if the selected event related to the printing system has occurred;

d) when the selected event related to the printing system has occurred, transmitting automatically the second set of information to the selected location; and e) wherein said analysis of said c) indicates that the customer may access a second billing plan on the basis of further usage, and wherein said d) includes providing the second set of information with a subset of information notifying the customer of an opportunity to access the second billing plan on the basis of further usage.

2. The method of claim 1, wherein said d) includes transmitting automatically the second set of information to the input/output station for review by the customer.

3. The method of claim 1, wherein said d) includes transmitting pricing information regarding both the first and second billing plans to the customer for comparison thereby.

4. The method of claim 1, further comprising linking the first billing plan with a first customer usage of the printing system and the second billing plan with a second customer usage of the printing system.

5. The method of claim 1, in which the selected event related to said printing system corresponds with an end of a preselected time period, wherein said d) includes transmitting automatically an invoice to the customer with the invoice varying as a function of the copies or prints produced by the customer in said printing system.

6. The method of claim 1, in which the first set of information includes a current copy count value and the accounting subsystem stores a reference copy count break point, further comprising comparing the current copy count value with the reference copy count break point, wherein said d) includes transmitting automatically a message to the customer indicating that the current copy count value is within a prespecified range of the reference copy count break point.

7. The method of claim 1, in which a bill, based on the updated first set of information, is generated in the printing system, and in which the selected event comprises said generation of the bill, wherein said d) includes transmitting automatically the bill to a location disposed on the network remotely of the input/output station.

8. The method of claim 8, wherein said d) includes transmitting automatically the bill to a payee institution along with information which allows for payment of the bill.

9. The method of claim 1, further comprising:

e) electronically receiving an invoice projection inquiry signal at the accounting subsystem;

f) based on the updated first set of information, generating an invoice projecting what a bill in the future will be based on current usage of the printing system by the customer.

10. The method of claim 1, in which a first set of one or more cost factors is stored in the printing system and a revision is made to the first set of one or more cost factors so as to create a second set of one or more cost factors, and in which the selected event related to the printing system relates to the revision made in the first set of cost factors, wherein said d) includes transmitting automatically a message to the customer informing the same of the revision made in the first set of cost factors.

11. The method of claim 10, wherein said d) includes transmitting automatically a subset of the second set of one or more cost factors to the customer.

12. In a printing system for producing copies or prints in which billing is developed for a customer of the printing system for the produced copies or prints on a basis of a pricing structure stored with a selected one of an accounting subsystem and a billing subsystem, the pricing structure including a plurality of print rates and the customer communicating with the selected one of the accounting subsystem and the billing subsystem by way of a network, a method for adjusting the pricing structure when a selected event related to the printing system occurs, comprising:

a) electronically communicating a set of print rate related information to the selected one of the accounting subsystem and the billing subsystem;

b) in response to said (a), electronically analyzing the pricing structure with the set of print rate related information to determine if the selected event related to the printing system has occurred; and c) when the selected event related to the printing system has occurred, electronically adjusting the pricing structure, without user intervention, to reflect an increase or decrease in at least one of the plurality of print rates of the pricing structure.

13. The method of claim 12, wherein said (b) includes determining whether a billing rate is to be increased as a result of a change in monetary currency.

14. The method of claim 12, wherein said (b) includes determining whether a billing rate will decrease as a result of further usage of the printing system by the customer.

15. The method of claim 12, in which the print related information includes profitability metrics of the printing system, wherein said (b) includes electronically analyzing the profitability metrics to determine whether the pricing structure should be adjusted.

* * * * *